UNITED STATES PATENT OFFICE.

CHARLES W. MERRILL, OF LEAD, SOUTH DAKOTA.

PROCESS OF TREATING METAL-BEARING MATERIALS.

No. 820,430.      Specification of Letters Patent.      Patented May 15, 1906.

Application filed July 7, 1905. Serial No. 268,729.

*To all whom it may concern:*

Be it known that I, CHARLES W. MERRILL, a citizen of the United States, and a resident of Lead, Lawrence county, State of South Dakota, have invented a new and useful Improvement in Processes for Treating Precious-Metal-Bearing Materials, of which the following is a specification.

My invention relates to an improvement in the art of treating precious-metal-bearing materials, particularly those ores or tailings which contain reducing salts or minerals with cyanogen-bearing solutions.

I have heretofore obtained or applied for Letters Patent for improvements in treating that class of ores and tailings which contain reducing salts or minerals with solutions of alkali-metal cyanids by filling the interstitial spaces with an oxidizing agent preliminary to contact with a cyanid solution. Now I have discovered that if after the first contact with the cyanogen-bearing solutions the cyanid solution is withdrawn and the interstitial spaces filled with an oxidizing agent under pressure greater than that of the atmosphere in a closed container and then again subjected to the treatment with the cyanogen-bearing solution the yield is often increased.

As is well known, all methods of crushing ore are divided, generally speaking, into what is known as "wet crushing" and "dry crushing," the former necessitating the presence of liquid in the material. The effect of the liquid being present with the mixed ore is merely incident to the operation and not essential, and hence in the various processes perfected by me prior to effecting oxidation the liquid is removed from the interstitial spaces of the mass by draining the containers of the filter-presses in which the same are collected in any convenient manner, after which the interstitial spaces are filled with the oxidizing agent, and the contact thus formed between the finely-divided metal-bearing material and the oxidizing agent is maintained until part or all of the reducing material has been oxidized. This oxidation in my previously patented processes has been effected by the introduction of atmospheric air or other oxidizing agent under pressure or a solution of a hypochlorite preliminary to the first contact with the cyanid solutions, and the effect of the oxidizing agent upon the reducing substance is very much greater, for the reason that in this manner an envelop of oxidizing agent is formed around the particles of solid matter and the said contact or envelop is maintained and renewed when necessary until part or all of the reducing material has been oxidized, after which the air or other oxidizing agent is then displaced and the cyanogen-bearing solution is introduced. Notwithstanding this preliminary oxidation, in some cases and in other cases where preliminary oxidation may be inadvisable I find it advantageous to introduce into the interstitial spaces of the mass in the closed container a cyanogen-bearing solution, and after the first contact with the solution the latter is removed from the interstitial spaces of the crushed ore in the container by draining or otherwise. I then cause a solution of a hypochlorite or other similar oxidizing agent under pressure to be introduced into the interstitial spaces of the mass in the closed container for the purpose of oxidizing all such particles of reducing material as may be there present. After this the air or other oxidizing agent is then displaced, and the particles within the container are subjected to further treatment with a cyanogen-bearing solution. For the purpose of effecting oxidation I employ, as in my previous processes, an alkali metal or alkaline earth metal hypochlorite, such as hypochlorite of calcium, and this hypochlorite mixed with chlorite of calcium in the form of bleaching-powder, which is obtainable in sufficient quantities at low cost, is effective for the purpose, or a gaseous oxidizing agent under pressure, such as compressed air.

The process is conducted in any closed form of container, to which the oxidizing agent under pressure may be applied after removal of the liquid, when there present, from the interstitial spaces of the crushed ore contained therein, the effect of such application being to provide an envelop of oxidizing agent around each particle of the crushed ore under a pressure greater than that of the atmosphere, which is only possible in closed containers.

I claim as my invention—

1. The improvement in treating a precious-metal-bearing material with cyanogen-bearing solutions in a closed container after preliminary contact with such solution consisting in removing the cyanogen-bearing solutions from the interstitial spaces of the crushed material, applying an oxidizing agent under pressure greater than that of the atmosphere to said material, and subsequently applying a cyanogen-bearing solution to said material.

2. The improvement in treating a precious-metal-bearing material with cyanogen-bearing solutions in a closed container after preliminary contact with such solution consisting in removing the cyanogen-bearing solutions from the interstitial spaces of the crushed material applying air under pressure greater than that of the atmosphere to said material and subsequently applying a cyanogen-bearing solution to said material.

3. The improvement in treating a precious-metal-bearing material with cyanogen-bearing solutions in a closed container after preliminary contact with such solution consisting in removing the cyanogen-bearing solutions from the interstitial spaces of the crushed material applying air under pressure greater than that of the atmosphere to said material and subsequently applying a cyanogen-bearing solution to said material in one and the same container.

4. The improvement in treating precious-metal-bearing material containing reducing agents with cyanogen-bearing solutions consisting in first collecting the crushed material in a closed container, applying a cyanogen-bearing solution to said material, subsequently removing said cyanogen-bearing solution from the interstitial spaces of said material, applying air under pressure greater than that of the atmosphere, and subsequently applying a cyanogen-bearing solution to said material in one and the same closed container.

In testimony that I claim the foregoing as my invention I have signed my name, in presence of two witnesses, this 22d day of May 1905.

CHARLES W. MERRILL.

Witnesses:
 ANSON T. BLAKE,
 H. E. JOHNSTON.